United States Patent Office 3,024,199
Patented Mar. 6, 1962

3,024,199
STABLE AQUASOLS OF HYDROUS RARE EARTH OXIDES AND THEIR PREPARATION
William H. Pasfield, Arden, Del., assignor to E. I. du Pont de Nemours and Company, Wilmington, Del., a corporation of Delaware
No Drawing. Filed Sept. 2, 1958, Ser. No. 758,540
8 Claims. (Cl. 252—313)

This invention relates to concentrated, stable aquasols of hydrous rare earth oxides and to methods for preparing the same.

The rare earths are a group of 15 remarkably similar elements following barium in the periodic table. These elements (and their respective atomic numbers) are as follows: Lanthanum (57), cerium (58), praseodymium (59), neodymium (60), illinium (61), samarium (62), europium (63), gadolinium (64), terbium (65), dysprosium (66), holmium (67), erbium (68), thulium (69), ytterbium (70), and lutecium (71).

I have now discovered how to prepare hydrous oxides of rare earths in the form of true aquasols which not only are stable, but also are concentrated. These new aquasols are completely novel and have very useful properties. For example, the aquasols of this invention are useful as binders, nucleating agents, and fillers for metals, polycrystalline bodies and glasses. They are also useful as catalysts, catalyst supports and refractory thickening agents.

More particularly, this invention relates to stable, hydrous rare earth oxide aquasols having a concentration of from about 10 to 50% by weight of rare earth oxide in the form of particles ranging from about 5 to 200 millimicrons in the largest dimension with length to diameter ratios of from about 1:1 to 5:1, and having a pH of from about 7.0 to 8.3. The invention also relates to processes for preparing these aquasols.

These processes of preparing the stable, hydrous rare earth oxide aquasols comprise the steps of contacting in aqueous solution at least one rare earth salt having monovalent anions with ammonia to produce a precipitate of the corresponding hydrous rare earth oxide, removing the major portion of the ammonium salts while maintaining the free ammonia content at a level sufficient to keep the pH in the range of from about 9.5 to 10.5 and peptizing the resulting hydrated hydrous rare earth oxide by heating at a temperature of from about 60 to 100° C. for from about 5 to 60 minutes while agitating. This aquasol product can be concentrated by evaporation by further heating in the range of from 60 to 100° C. until the concentration of rare earth oxide is in the range of from about 10 to 50% by weight.

Details of the products and processes will now be discussed and then specific examples will be described.

The starting materials for use in the processes of the present invention can be any rare earth salt or salts of a monobasic acid. Thus, the anion in such rare earth salt or salts can be chloride, bromide, iodide, formate, acetate, nitrate and perchlorate, though of course, the monovalent anions are not necessarily limited to these particular ones. The art well knows how to prepare such rare earth salts and, in fact, many of these salts are commercially available, either singly or in mixtures.

Such a rare earth salt or salts is dissolved in water so as to form an aqueous solution. Such solution is treated with ammonia and there is produced a precipitate of hydrous earth oxide(s). The concentration of rare earth salt starting material in the solution is not critical, although for obvious practical reasons, more concentrated solutions (i.e., those greater than 0.5 weight percent) are preferred.

In this precipitation step, it is not necessary to use an excess of ammonia if an ammonia wash is used later in the process. However, the preferred procedure is to use an excess of ammonia during the precipitation step.

Satisfactory products result regardless of how the rare earth salt solution and the ammonia are brought together. The ammonia can be added in the gaseous state to this solution by bubbling it into the salt solution. Alternatively, the ammonia can be added to the salt solution in the form of an aqueous solution.

If an aqueous ammonia solution is used it may be more convenient to add the salt solution to the aqueous ammonia solution or perhaps to add the two solutions together simultaneously to a heel of water or aqueous ammonia. The rate at which the two respective solutions are combined is not critical.

In general, the method of combining the ammonia with the rare earth salt solution can be carried out in any convenient manner and such operation can normally be carried out at room temperature although any convenient temperature can be used.

The product obtained by combining the solution of rare earth metal salt or salts with ammonia consists of water, hydrous rare earth oxide or oxides, ammonium salt or salts, and optionally some excess ammonia, for example, up to a twofold excess.

The next step in the processes of the invention is to remove essentially all of the soluble ammonium salts and some of the excess ammonia. This can be accomplished in any one of a variety of ways, including decanting and washing, filtering and washing, dialysis, or ion exchange.

Removal of the ammonium salts from the slurry can be effected by dialysis, or by dispersing the solids in an aqueous phase and then collecting the solids by filtration, sedimentation, or centrifugation. In this last indicated procedure it has been found that if the aqueous phase used in the initial washing is from approximately 0.5 N to 18 N in NH$_3$, the resulting wash slurry is more easily peptized than slurries washed only with water. Following this initial washing with aqueous ammonia, a final washing with water is required. Preferably distilled water is used for this final washing.

The rate at which the ammonium salt is removed from the slurry is determined by a number of factors. The most noteworthy of these are the nature of the precipitate, the nature of the anion, the concentration of the anion, the temperature, and the length of time the slurry is allowed to stand in contact with the aqueous wash phase.

The over-all conditions as respects anion content and pH which must prevail during this process of removing anions and ammonia is most simply and accurately expressed directly. Thus, I have found that it is best to carry out removal of anions and excess ammonia by means which will maintain the free ammonia content at a level sufficient to cause the pH to be in the range of from about 9.5 to 10.5 while at the same time the ratio of hydrous rare earth oxide to monovalent anion is maintained in the range of from about 7.5 to 20, by washing the precipitate with dilute aqueous ammonia.

During this step of removing anions and excess ammonia, it is most important that the hydrous oxide slurry be kept constantly moist or hydrated and not be allowed to dry even partially, i.e., the percent water in the precipitate should be at least 50% by weight.

The next step after reducing the anion content and the ammonia content is to peptize the product. Usually this product is in the form of a washed hydrous oxide which is relatively dilute there being only about 1 to 2 percent solids by weight present. Such a product is in the form of a slurry. Of course, any varying degree of hydrous oxide thickness can be obtained up to a filter cake having a jell-like physical appearance and containing approximately 8 to 10 percent hydrous oxide. Any and all of these forms are suitable for peptization.

The anion adjusted, ammonia adjusted product is then heated. Preferably this product has one part of hydrous rare earth oxide precipitate per ten parts water to produce a concentrated sol. Temperatures greater than 60° C. should be maintained, but preferably temperatures below 100° C. should be used. Temperatures in this range should be maintained for a period of from about 5 to 60 minutes during which time the slurry should be agitated. Actually, peptization is usually complete within a matter of some 5 to 10 minutes after a temperature of 60° C. is reached. During peptization, the pH of the slurry is reduced from about 9.5 to 10.5 to about 7.0 to 8.3.

What actually happens during this peptization step is that the hydrous rare earth oxide, for reasons not altogether clear, becomes dispersed in the form of a true sol in its own slurry water. Thus a material which consisted of a gel-like mass or a precipitate in water is transformed into a fluid, relatively nonviscous, homogeneous, colloidal solution in which the rare earth particles are no longer linked together, but are present as discrete or individual units.

After peptizing, the anion content can be varied somewhat without affecting sol stability. Thus, the mole ratio of hydroxide to the stabilizing anion can be in the range 6.6:1 to 165:1, and preferably from 8.5:1 to 33:1. These sols are stable in the pH range 7.0 to 8.3. Because of the basic nature of the rare earths, any attempt to reduce the pH below this range causes dissolution of the rare earth hydrous oxides and formation of the corresponding rare earth salts. At pH's higher than the stated range, these sols become turbid and form gels.

From the peptized material prepared in the manner just described, containing from about 1 to 10% solids, concentrated aquasols can be prepared by evaporation of water by heating from about 60 to 100° C., preferably at reduced pressure, i.e., pressures from 25 to 400 mm.

In general, the aquasols produced according to the foregoing described processes have colors characteristic of the rare earth elements they contain. Sols having a concentration greater than about 15 weight percent are thixotropic.

The inorganic particles in the sols are dense, microcrystalline substances ranging from approximately 5 to 200 millimicrons in the largest dimensions and are generally rod-like in shape. These particles have length to diameter ratios of up to about 5:1.

Chemically, these particles of the sols consist predominately of the hydrous oxides of one or several of the rare earth elements. For purposes of this application, hydrous oxide is an oxide which precipitates with an indefinite amount of absorbed water, and a hydrate is a compound which contains a definite amount of water.

Particularly preferred products of the invention are those aquasols of hydrous didymium oxide. Didymium is the name given to a cerium-free mixture of the lighter rare earths. Thus, didymium oxide usually contains from about 40 to 50 percent $La_2O_3$, from about 35 to 40 percent of $Nd_2O_3$, from about 8 to 15 percent $Pr_6O_{11}$, from about 3 to 8 percent of $Sm_2O_3$ and from about 0 to 4 percent of various other rare earths including yttrium oxide.

The following examples illustrate various forms of the invention. While the invention is illustrated in these examples by means of specific mixtures and preparation techniques, those skilled in the art will realize that no unnecessary limitations are to be derived therefrom and alternates are as earlier described in the specification.

EXAMPLE 1

(a) 60 g. of commercial didymium chloride (from Lindsay Chemical Co.) was dissolved in 300 ml. of water and filtered to give a clear solution. This solution was combined with 300 ml. of concentrated aqueous ammonia by adding the two solutions simultaneously and at the same rate to a "heel" of 100 ml. of concentrated aqueous ammonia.

The ammonium chloride was removed by diluting the resulting slurry to 2 liters with 6 N $NH_3$ and shaken for 5 minutes. The hydrous didymium oxide was separated from the wash solution by centrifuging and washed twice more with 6 N $NH_3$ in a similar manner. The ammonia washed hydrous didymium oxide was then diluted to 2 liters with distilled water and agitated for 5 minutes. The hydrous didymium oxide was then separated from the wash solution by centrifugation. A similar washing with distilled water was carried out three additional times. The pH of the final wash solution was 9.7 and the chloride content of the centrifuge cake was 0.15%. This centrifuge cake was heated for 10 minutes at 60° C. and peptized to give an 8.1% hydrous didymium oxide sol. This sol had a relative viscosity of 1.68, a density of 1.064 g./ml., and a conductivity of $8 \times 10^{-3}$ mhos/con. The sol was stable, i.e., the particles showed no tendency to settle on standing at room temperature for one month. Moreover, during this time the viscosity remained constant.

(b) This sol was concentrated to 30% by vacuum evaporation of water at a temperature of 65° C. This sol contained rod-like particles of hydrous didymium oxide which were about 120 millimicrons long and 30 millimicrons thick. The sol had a density of 1.33 g./ml., and a pH of 7.3.

EXAMPLE 2

The identical procedure in Example 1 was used to prepare a hydrous didymium oxide sol from commercial didymium nitrate. The resulting sol, containing 8.3% hydrous didymium oxide and 0.25% nitrate ion, was concentrated threefold by evaporation of water at 50° C.

EXAMPLE 3

Hydrous didymium oxide was precipitated as in Example 1. The resulting slurry was dialyzed against 3 N $NH_3$ until the chloride ion content was reduced to 0.08%. Distilled water was then used to replace the 3 N $NH_3$ and dialysis was continued until the pH was reduced to 9.6. The slurry was then heated to 70° C. for 10 minutes to give a 2.7% sol.

This sol was then concentrated tenfold to 27% solids by evaporation of water at a temperature of 85° C.

EXAMPLE 4

Hydrous didymium oxide was precipitated as in Example 2. The resulting slurry was diluted to 2 liters with distilled water, shaken for 5 minutes and then centrifuged. This wash procedure was carried out three additional times. The final filter cake was heated at 80° C. for 15 minutes to give a 7.9% sol. A small amount of the slurry did not peptize. The sol was then concentrated by a factor of 5.

EXAMPLE 5

A solution of 20 g. of cerium chloride heptahydrate in 75 ml. of water was added to 75 ml. of concentrated ammonia. The resulting slurry was diluted to 500 ml. with 5 N $NH_3$ and shaken for 5 minutes. The hydrous cerium oxide was then separated from the ammonia wash solution by centrifuging. Distilled water was then added to the hydrous serium oxide to a total volume of 500 ml. After shaking for 5 minutes, the wash solution was removed by centrifugation.

In an identical manner the hydrous cerium oxide was washed with water three more times. Extensive autopeptization occurred during the last wash. The autopeptized material when heated to 60° C. became more transparent indicating that the sol had become more highly dispersed. The centrifugal cake when heated to 75° C. for 15 minutes peptized to give a violet sol.

Both of these sols, when heated to approximately 60° C. while air was being passed through them, changed from violet to orange but did not gel or flocculate.

EXAMPLE 6

A solution of 20 g. of lanthanum chloride heptahydrate in 75 ml. of water was added to 75 ml. of concentrated ammonia. The resulting slurry was diluted to 500 ml. with distilled water and shaken for 5 minutes. The hydrous lanthanum oxide was separated from the wash solution by centrifugation. In a similar fashion, the hydrous oxide was washed with water an additional 3 times. The final filter cake was slurried in twice its volume of water and heated to 70° C. for 30 minutes. The slurry peptized to give a 2% sol.

*Table I*

PROPERTIES OF SOLS PREPARED IN EXAMPLES 1–6

| Example | Percent hydrous oxide | Density | Rel. viscosity | Conductivity, mhos/cm. | pH | Particle size, m$\mu$ |
|---|---|---|---|---|---|---|
| 1a | 8.1 | 1.064 | 1.68 | 8×10⁻³ | 7.3 | 15–30 |
| 1b | 30 | 1.334 | (¹) | | 7.1 | 15–30 |
| 2 | 8.3 | 1.066 | 1.72 | 7×10⁻³ | 7.2 | 5–50 |
| 3 | 2.7 | 1.020 | 1.09 | 5×10⁻³ | 7.3 | 10–40 |
| 4 | 7.9 | 1.061 | 1.63 | 8×10⁻³ | 7.3 | 15–80 |
| 5 | 3.1 | 1.022 | | 1×10⁻³ | 7.0 | 20–200 |
| 6 | 2.3 | 1.016 | | | 7.4 | 5–100 |

¹ Thixotropic.

NOTE.—Using procedures equivalent to those described in Examples 1 through 6, stable, transparent hydrous oxide aquasols of neodymium, praseodymium, samarium, promethium, europium, gadolinium, terbium, dysprosium, holmium, erbium, thulium, ytterbium, lutecium and yttrium are prepared in concentrations ranging up to about 10% by weight. More concentrated sols of these hydrous oxides are obtained by vacuum evaporation of the dilute sol at reduced pressure (25 to 400 mm./g.) and at temperatures of 60–80° C.

The claims are:

1. A stable aquasol of a hydrous oxide of a rare earth element having an atomic number of from 57 to 71, inclusive, the aquasol having a concentration of from 10 to 50% by weight of said rare earth oxide in the form of particles ranging from about 5 to 200 millimicrons in the largest dimension with length to diameter ratios of from about 1:1 to 5:1 and having a pH of from 7.0 to 8.3, and containing a stabilizing monovalent anion, the mol ratio of said rare earth oxide to stabilizing monovalent anion being from 6.6:1 to 165:1.

2. A stable aquasol of a hydrous oxide of a rare earth element having an atomic number of from 57 to 71, inclusive, the aquasol having a concentration of from 10 to 50% by weight of said rare earth oxide in the form of particles ranging from about 5 to 200 millimicrons in the largest dimension with length to diameter ratios of from about 1:1 to 5:1 and having a pH of from 7.0 to 8.3, and containing a stabilizing monovalent anion, the mol ratio of said rare earth oxide to stabilizing monovalent anion being from 8.5:1 to 33:1.

3. A stable aquasol of a hydrous didymium oxide the aquasol having a concentration of from 10 to 50% by weight of said didymium oxide in the form of particles ranging from about 5 to 200 millimicrons in the largest dimension with length to diameter ratios of from about 1:1 to 5:1 and having a pH of from 7.0 to 8.3, and containing a stabilizing monovalent anion, the mol ratio of said didymium oxide to stabilizing monovalent anion being from 6.6:1 to 165:1.

4. A stable aquasol of lanthana having a concentration of from 10 to 50% by weight of said lanthana in the form of particles ranging from about 5 to 200 millimicrons in the largest dimension with length to diameter ratios of from about 1:1 to 5:1 and having a pH of from 7.0 to 8.3, and containing a stabilizing monovalent anion, the mol ratio of said lanthana to stabilizing monovalent anion being from 6.6:1 to 165:1.

5. A stable aquasol of ceria having a concentration of from 10 to 50% by weight of said ceria in the form of particles ranging from about 5 to 200 millimicrons in the largest dimension with length to diameter ratios of from about 1:1 to 5:1 and having a pH of from 7.0 to 8.3, and containing a stabilizing monovalent anion, the mol ratio of said ceria to stabilizing monovalent anion being from 6.6:1 to 165:1.

6. A process for preparing a stable aquasol of a hydrous oxide of a rare earth element having an atomic number of from 57 to 71, inclusive, the process comprising the steps of contacting with ammonia in aqueous solution a salt of a monovalent anion and a rare earth element having an atomic number of from 57 to 71, inclusive, to produce a precipitate of the corresponding rare earth oxide, removing essentially all of the soluble ammonium salts while maintaining the free ammonia content at a level to keep the pH in the range of from about 9.5 to 10.5 and then peptizing the resulting hydrous rare earth oxide by heating 1 part of the hydrous rare earth oxide precipitate with at least 10 parts of water at a temperature of from about 60 to 100° C. for from about 5 to 60 minutes while agitating, the monovalent anion content of the peptized product being such that the mol ratio of rare earth oxide to said anion is from 6.6:1 to 165:1.

7. A process for preparing a stable aquasol of a hydrous oxide of a rare earth element having an atomic number of from 57 to 71, inclusive, the process comprising the steps of contacting with ammonia in aqueous solution a salt of a monovalent anion and a rare earth element having an atomic number of from 57 to 71, inclusive, to produce a precipitate of the corresponding rare earth oxide, washing such precipitate first with aqueous ammonia and then with distilled water to remove essentially all of the ammonium salts to produce a product wherein the mol ratio of rare earth oxide to monovalent anion is 7.5 to 20 and the pH is from 9.5 to 10.5, and then peptizing the resulting hydrous rare earth oxide by heating an aqueous slurry containing from 8 to 10% of the washed hydrous rare earth oxide at a temperature of from about 60 to 100° C. for from about 5 to 60 minutes while agitating, the monovalent anion content of the peptized product being such that the mol ratio of rare earth oxide to said anion is from 6.6:1 to 165:1.

8. The process of claim 7 wherein the aquasol product is concentrated by evaporation by heating from about 60 to 100° C. until the concentration of rare earth oxide is in the range of from about 10 to 50% by weight.

References Cited in the file of this patent

UNITED STATES PATENTS

| 899,875 | Kuzel | Sept. 29, 1908 |
| 1,797,760 | Rohden | Mar. 24, 1931 |

FOREIGN PATENTS

| 281,305 | Germany | Dec. 31, 1914 |

OTHER REFERENCES

Weiser: "Inorganic Colloid Chemistry," vol. III, "The Hydrous Oxides and Hydroxides," Wiley & Sons, N.Y. (1935), pages 276–86.